United States Patent [19]
Kobayashi et al.

[11] Patent Number: 5,909,242
[45] Date of Patent: *Jun. 1, 1999

[54] VIDEO CAMERA WITH ELECTRONIC PICTURE STABILIZER

[75] Inventors: Akio Kobayashi, Hirakata; Akira Toba, Osaka, both of Japan

[73] Assignee: Sanyo Electric Co., Ltd., Moriguch, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/611,506

[22] Filed: Mar. 6, 1996

Related U.S. Application Data

[63] Continuation of application No. 08/266,763, Jun. 28, 1994, abandoned.

[30] Foreign Application Priority Data

Jun. 29, 1993 [JP] Japan ................................ 5-159463
Jul. 20, 1993 [JP] Japan ................................ 5-178653

[51] Int. Cl.$^6$ .................................................. H04N 5/228
[52] U.S. Cl. ........................................ 348/208; 348/352
[58] Field of Search .................................... 348/208, 352, 348/430, 443, 699; H04N 5/225, 5/232

[56] References Cited

U.S. PATENT DOCUMENTS

| | | | |
|---|---|---|---|
| 4,864,398 | 9/1989 | Avis et al. ............................ | 348/443 |
| 5,099,323 | 3/1992 | Morimura et al. .................... | 348/208 |
| 5,170,255 | 12/1992 | Yamada et al. ....................... | 348/208 |
| 5,237,405 | 8/1993 | Egosa et al. .......................... | 348/208 |

FOREIGN PATENT DOCUMENTS

| | | |
|---|---|---|
| 0449283 A2 | 10/1991 | European Pat. Off. . |
| 0543394 A3 | 5/1993 | European Pat. Off. . |

OTHER PUBLICATIONS

Uomori, Kenya et al., *Electronic Image Stabilization System for Video Cameras and VCRs.* SMPTE Journal, Feb. 1992, pp. 66–75.

Uomori et al., Automatic Image Stabilization System by Full–Digital Signal Processing, IEEE Trans. on Consumer Electronics vol. 36, No. 3, Aug. 1990.

Park et al., An Adaptive Motion Decision System for Digital Image Stabilizer Based on Edge Pattern Matching, IEEE Trans. on Consumer Electronics, vol. 38, No. 3 Aug. 1992.

*Primary Examiner*—Wendy Garber
*Assistant Examiner*—Aung S. Moe
*Attorney, Agent, or Firm*—Armstrong, Westerman, Hattori, McLeland & Naughton

[57] ABSTRACT

A video camera (10) includes a microcomputer (26) which determines whether each of detection areas defined within an image field (44) is valid or invalid. If there is a valid detection area, luminance addition data and color addition data are evaluated by an addition data generating circuit (46) for each of addition regions of 64, for example, which are defined by dividing the image field (44). Differences of the addition data between a given addition region and a left adjacent addition region in a horizontal direction and an upper adjacent addition region in a vertical direction are evaluated, and the differences are compared with predetermined values. If comparisons satisfy predetermined conditions, a count value is incremented. On the basis of a total count value of the horizontal direction and a total count value of the vertical direction, it is determined whether or not an object is an object having repeated pattern, and a whole motion vector $V_n$ is evaluated by methods being different from each other according to a determination result. Then, an integration vector $S_n$ is evaluated according to a status of the video camera, whereby a blurring of an image due to an unintentional motion of the video camera can be corrected.

21 Claims, 11 Drawing Sheets

UNINTENTIONAL MOTION

VIDEO CAMERA WITH ELECTRONIC PICTURE STABILIZER

This application is a continuation of application Ser. No. 08/266,763 filed Jun. 28, 1994, now abandoned.

BACKGROUND OF THE INVENTION

1. Field of the Invention

The present invention relates to a video camera. More specifically, the present invention relates to a compact video camera with electronic picture stabilizer, which is utilized as a camcorder, for example.

2. Description of the Related Art

One example of a method for detecting an unintentional motion component of an image sensing device is disclosed in, for example, the 20th image engineering conference in 1989 by Matsushita Electric Industrial Corporation. In this prior art method, by utilizing a motion vector obtained by a representative point matching method disclosed in, for example, Japanese Patent Application Laying-open No. 61(1986)-201581 [H04N 7/137], the motion component of the image sensing device is detected according to image information. In this prior art, an attenuation coefficient is used for performing the correction of a blurring of an image due to the unintentional motion, i.e. the electronic picture stabilization. Furthermore, four detection areas are arranged in an image field or screen, and therefore, four portion motion vectors are obtained from the image field.

Now, a method for performing the correction of the blurring of the image due to the unintentional motion, i.e., the electronic picture stabilization on the basis of the portion motion vectors will be described. As a whole motion vector, a mean value of the four portion motion vectors, or a mean value of two portion motion vectors having intermediate values in the four portion motion vectors is utilized. If the whole motion vector is $V_n$, an integration vector $S_n$ is represented by the following equation.

$$S_n = k \cdot S_{n-1} + V_n$$

where, k is called as an attenuation coefficient, being a decimal number smaller than 1.

As shown in FIG. 9, for example, an image extracting position is moved by utilizing the integration vector $S_n$ thus obtained, whereby a blurring of an image due to the unintentional motion of the video camera is corrected.

However, in this prior art method, even if the whole motion vector $V_n$ is zero, the image extracting position is centered such that the integration vector $S_n$ approaches zero with time lapse. That is, there was a problem in the prior art method that the image in the screen moves even when no movement occurs in the video camera.

SUMMARY OF THE INVENTION

Therefore, a principal object of the present invention is to provide a video camera having a novel electronic picture stabilizer.

Another object of the present invention is to provide a video camera with electronic picture stabilizer capable of accurately performing correction of the blurring of the image due to the unintentional motion of the video camera, i.e., the electronic picture stabilization.

A video camera according to the present invention includes first integration vector calculating means and second integration vector calculating means. The integration vector $S_n$ is calculated according to the equation of $S_n = K_1 \cdot S_{n-1} + V_n$ with respect to the whole motion vector $V_n$ in the first integration vector calculating means, and in the second integration vector calculating means, the integration vector $S_n$ is calculated according to the equation of $S_n = S_{n-1} - K_2 \cdot |V_n|$. That is, the integration vector for correcting the blurring of the image due to the unintentional motion of the video camera is calculated in the first integration vector calculating means, and in the second integration vector calculating means, the integration vector for forcedly centering the image extracting position is calculated.

First detection means detects a panning or tilting of the video camera.

Therefore, if the first detection means detects the panning or tilting when correction means performs the correction (electronic picture stabilization) by utilizing the integration vector calculated by the first integration vector calculating means, the correction means performs the correction by utilizing the integration vector calculated by the second integration vector calculating means.

Second detection means detects the completion of the panning or tilting of the video camera, and third detection means detects that the integration vector is smaller than a first predetermined value.

Therefore, if the second detection means detects the completion of the panning or tilting and the third detection means detects that the integration vector is smaller than the first predetermined value when the correction means performs the correction by utilizing the integration vector calculated by the second integration vector calculating means, the correction means performs the correction by utilizing the integration vector calculated by the first integration vector calculating means.

In an aspect of the present invention, the video camera further comprises third integration vector calculating means by which an integration vector $S_n$ is calculated according to the equation of $S_n = K_3 \cdot S_{n-1} + V_n$ with respect to the whole motion vector $V_n$; however, the integration vector is calculated according to the equation of $S_n = S_{n-1}$ when the whole motion vector is smaller than one pixel. That is, the calculating method of the integration vector in the third integration vector calculating means is similar to that of the first integration vector calculating means; however, when the whole motion vector is smaller than one pixel, in the third integration vector calculating means, as the integration vector of a present field or frame, the integration vector of the last field or frame is utilized. When the motion or movement of the video camera is small in such a case where the video camera is fixed by a tripod, the centering operation is stopped.

Fourth detection means detects that the whole motion vector is smaller than a second predetermined value, and fifth detection means detects that the integration vector is larger than a third predetermined value.

Therefore, if the fourth detection means detects that the whole motion vector is smaller than the second predetermined value and the fifth detection means detects that the integration vector is larger than the third predetermined value when the correction means performs the correction by utilizing the integration vector calculated by the first integration vector calculating means, the correction means performs the correction by utilizing the integration vector calculated by the third integration vector calculating means.

Furthermore, if the third detection means detects that the integration vector is smaller than the first predetermined value when the correction means performs the correction utilizing the integration vector calculated by the third integration vector calculating means, the correction means performs the correction by utilizing the integration vector calculated by the first integration vector calculating means. Then, if the panning or tilting of the video camera is detected by the first detection means, the correction means performs the correction by utilizing the integration vector calculated by the second integration vector calculating means.

Furthermore, if the second detection means detects the completion of the panning or tilting of the video camera, and the third detection means detects that the integration vector is larger than the first predetermined value when the correction means performs the correction by utilizing the integration vector calculated by the second integration vector calculating means, the correction means performs the correction by utilizing the integration vector calculated by the third integration vector calculating means.

In another aspect of the present invention, the video camera further comprises fourth integration vector calculating means in which an integration vector $S_n$ is calculated according to the equation of $S_n=K_4 \cdot S_{n-1}+V_n$ with respect to the whole motion vector $V_n$; however, when the whole motion vector is smaller than one pixel, the integration vector is calculated according to the equation of $S_n=S_{n-1}$. Although the fourth integration vector calculating means calculates the integration vector in a manner similar to that of the third integration vector calculating means, an attenuation coefficient $K_4$ is smaller than the attenuation coefficient $K_3$, and therefore, the centering operation by utilizing the integration vector calculated by the fourth integration vector calculating means becomes more rapid than the centering operation by utilizing the integration vector calculated by the third integration vector calculating means.

Sixth detection means detects that the integration vector exists within a predetermined range.

Therefore, if the fourth detection means detects, that the whole motion vector is smaller than the second predetermined value and the sixth detection means detects that the integration vector exists within the predetermined range when the correction means performs the correction by utilizing the integration vector calculated by the first integration vector calculating means, the correction means performs the correction by utilizing the integration vector calculated by the fourth integration vector calculating means.

If the third detection means detects that the integration vector is smaller than the first predetermined value when the correction means performs the correction by utilizing the integration vector calculated by the fourth integration vector calculating means, the correction means performs the correction by utilizing the integration vector calculated by the first integration vector calculating means. In addition, when the first detection means detects the panning or tilting of the video camera, the correction means performs the correction by utilizing the integration vector calculated by the second integration vector calculating means. Furthermore, when the fifth detection means detects that the integration vector is larger than the third predetermined value, the correction means performs the correction by utilizing the integration vector calculated by the third integration vector calculating means.

If the sixth detection means detects that the integration vector exists within the predetermined range when the correction means performs the correction by utilizing the integration vector calculated by the third integration vector calculating means, the correction means performs the correction by utilizing the integration vector calculated by the fourth integration vector calculating means.

In addition, the first detection means detects the panning or tilting of the video camera on the basis of the integration vector or the whole motion vector, and the second detection means detects the completion of the panning or tilting of the video camera on the basis of the whole motion vector.

In addition, in another aspect of the present invention, as described below, the whole motion vector is calculated according to a count value of first count, means and a count value of a second count means.

More specifically, an image signal level is sampled with a predetermined sampling frequency. A predetermined number of image signal levels that are succeedingly obtained in a time sequence are added to each other by addition means, whereby image signal addition data can be obtained. The image signal addition data is evaluated or each of addition regions formed by dividing an image field. A difference between the image signal addition data of a given integration region and the image signal addition data of an addition region adjacent to that addition region in a horizontal direction is evaluated by first arithmetic operation means. The difference is also evaluated for each of the addition regions. Furthermore, a difference between the image signal addition data of a given addition region and the image signal addition data of an addition region adjacent to that addition region in a vertical direction is evaluated by second arithmetic operation means. The difference is also evaluated for each of the addition regions. The first count means counts the number of times that the difference evaluated by the first arithmetic operation means is equal to or smaller than a first threshold value, and the second count means counts the number of times that the difference evaluated by the second arithmetic operation means is equal to or smaller than the second threshold value. Then, by division means, for example, a larger count value of the count values of the first count means and the second count value is divided by a smaller count value of the same. A division result is compared with a third threshold value by comparing means. If the division result smaller than the third threshold value, it is determined that an object is an object having no repeated pattern, and therefore, a mean value of portion motion vectors of valid detection areas is evaluated by first means, and the same is made as the whole portion motion vector between the adjacent fields or frames. If the object is an object having a repeated pattern, by second means, the whole motion vector of the last field or frame is made as the whole motion vector of the present field or frame. In addition, as the image signal level, a color signal level and a luminance signal level can be utilized.

Thus, the integration vector $S_n$ is evaluated by changing the integration vector calculating means in accordance with a status of the video camera, whereby the unintentional motion of the video camera can be corrected.

In accordance with the present invention, by changing a method for evaluating the integration vector $S_n$ according to the status of the video camera, the movement of the image due to the centering operation after the panning or tilting the video camera does not occur. For example, if the centering operation is approximately completed during a time that the panning or tilting of the camera is performed, a time period for centering operation after the panning or tilting can be shortened. Since the video camera is moved during a time that the panning is performed, it is possible to perform the centering operation image during a time that the panning is performed while an user of the video camera does not note that the centering operation is performed. Accordingly, in accordance with the present invention, it is possible to accurately performs the correction of the blurring of the image due to the unintentional motion of the video camera, i.e. the electronic picture stabilization.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
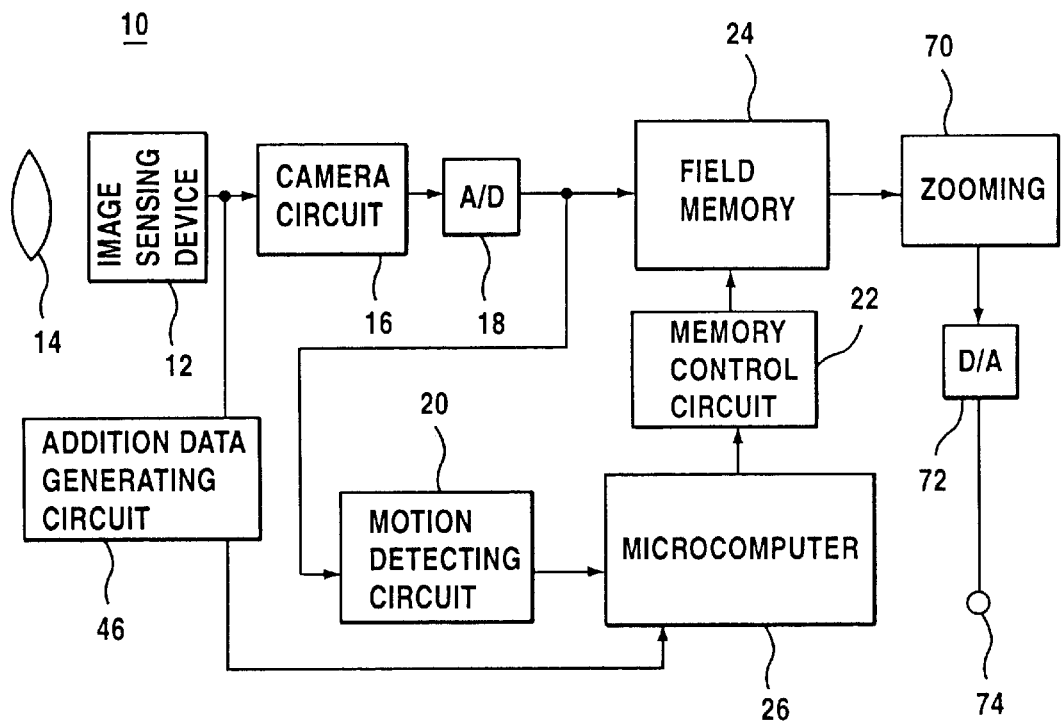
FIG. 1 is a block diagram showing one embodiment according to the present invention.

A video camera 10 of a preferred embodiment shown in FIG. 1 includes a solid-state image sensing device 12 such as a CCD (Charge-Coupled Device) which converts an optical signal being inputted from an object (not shown) through a lens 14 into an electric signal. The electric signal from the solid-state image sensing device 12 is inputted to a camera circuit 16. As is well known, the camera circuit 16 includes a sample-hold circuit by which the electric signal from the solid-state image sensing device 12 is sampled and held. A level of the electric signal thus sampled and held is adjusted by an AGC (Automatic Gain Control), and synchronization signals are added to the electric signal by a synchronization signal adding circuit (not shown). Thus, the camera circuit 16 converts the electric signal from the solid-state image sensing device 12 into an analog video signal. The analog video signal is further converted into a digital video signal by an A/D converter 18. The digital video signal is applied to a motion detecting circuit 20. As the motion detecting circuit 20, for example, an LSI "L7A0948" manufactured by Sanyo Electric Co., Ltd. who is an assignee of the present invention may be utilized. Under control of a memory control circuit 22 which is included in the same LSI constituting the motion detecting circuit 20, the digital video signal is written into a field memory 24 field by field.

Figure 3:
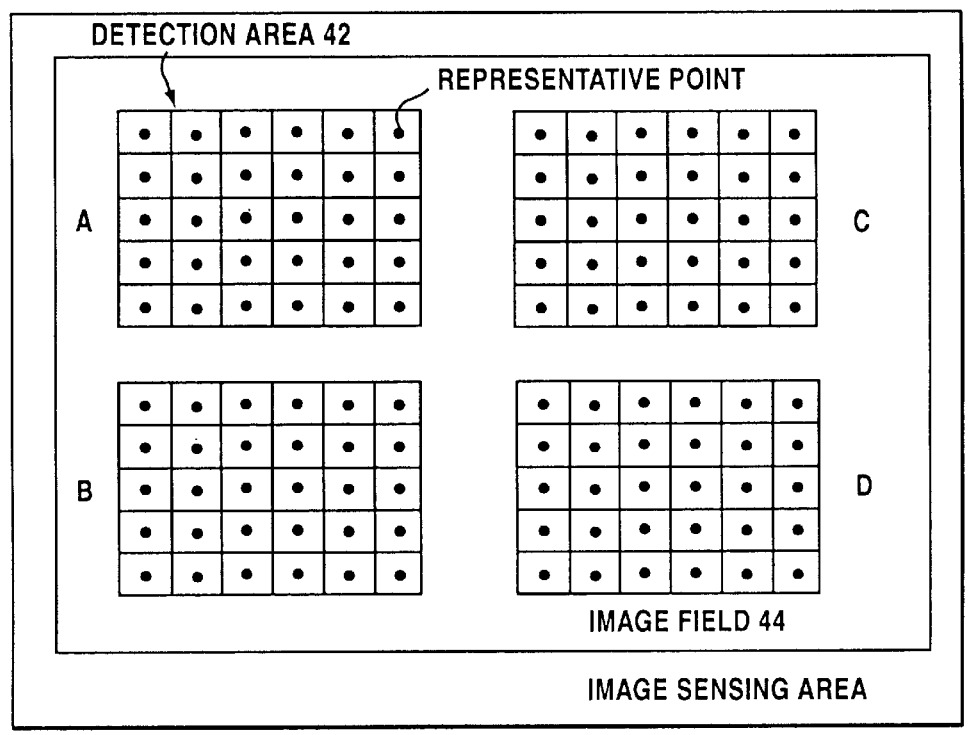
FIG. 3 is an illustrative view showing a principle of an electronic zooming and detection areas within an image field.

The motion detecting circuit 20 evaluates, for each of four detection areas A, B, C and D shown in FIG. 3, a position of one point having a highest correlation degree (a minimum correlative value) and positions of four points around the one point, and correlative values by utilizing a well-known representative point matching method. The position data and the correlative value data are applied to a microcomputer 26.

Figure 2:
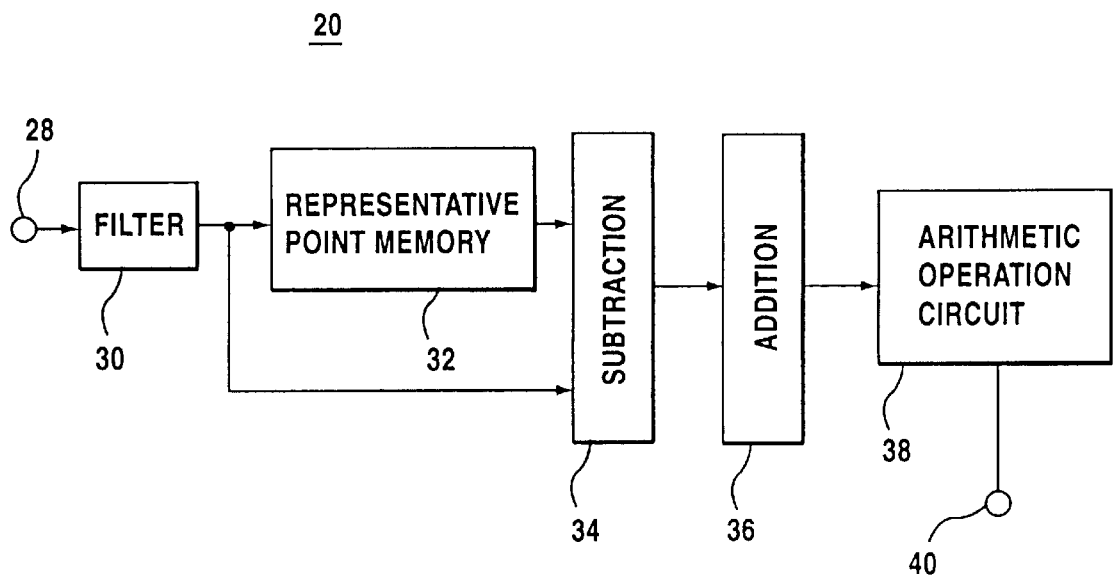
FIG. 2 is a block diagram showing a motion detecting circuit of FIG. 1 embodiment.
Figure 4:
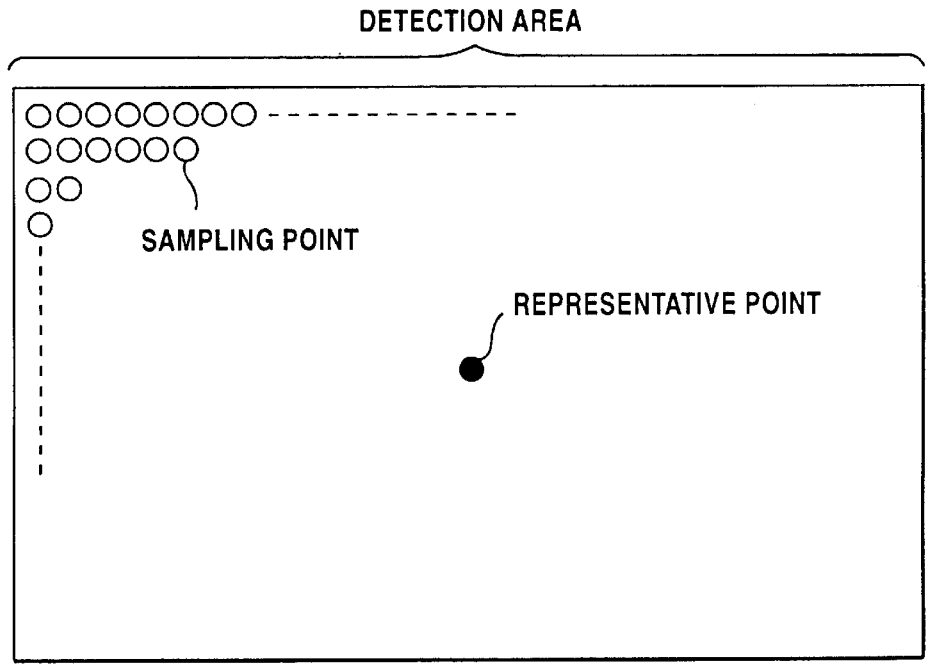
FIG. 4 is an illustrative view showing a principle of the electronic zooming and representative points and sampling points in the detection areas.

More specifically, with reference to FIG. 2, the motion detecting circuit 20 shown in FIG. 1 includes an input end 28 which receives the digital video signal from the A/D converter 18. The digital video signal inputted to the input end 28 is applied to the representative point memory 32 and a subtracting circuit 34, respectively, through a filter 30. The filter 30 is a kind of digital low-pass filter which is utilized for improvement of an S/N ratio so as to secure a significant detection accuracy with a lesser number of representative points. The representative point memory 32 stores position data and luminance data of a plurality of representative points within each of the respective detection areas A–D shown in FIG. 3. In this embodiment shown, each of the detection areas is divided into thirty (30) regions, and therefore, thirty (30) representative points are determined, and accordingly, the representative point memory 32 stores the position data and the luminance data of the thirty (30) representative points. Each of the divided regions 42 (FIG. 4) is constituted by 32 pixels in a horizontal direction (X direction)×16 pixels in a vertical direction (Y direction).

The subtracting circuit 34 executes subtracting operations of the luminance data of the representative point of the last field read-out the representative point memory 32 and luminance data of all the pixels of the present field applied from the input end 28 via the filter 30, and obtains absolute values of subtraction results. That is, the subtracting circuit 34 evaluates a luminance difference between the luminance data of the present field and the luminance data of the last field, and applies the luminance differences to an accumulating and adding circuit 36. The accumulating and adding circuit 36 executes an accumulation and addition of the luminance differences of thirty (30) in this embodiment obtained by the subtracting circuit 34 of the same position or pixel in the same region 42 so as to output correlative values data. The correlative values data is applied to an arithmetic operation circuit 38 which evaluates a minimum correlative value and calculates an average correlative value for each of the detection areas A–D, and evaluates position data of the pixel having the minimum correlative value. Data of the minimum correlative value, average correlative value and positions thus obtained by the arithmetic operation circuit 38 is applied to the above described microcomputer 26 from an output end 40. In addition, such arithmetic operations for the correlative values can be performed by the above described LSI "L7A0948".

Then, in the microcomputer 26, a motion vector of a whole screen, i.e. the image field 44 (FIG. 3) (simply called as "whole motion vector $V_n$") is calculated on the basis of the position data and the correlative value data.

First, a deviation of a pixel indicative of the minimum correlative value from the representative point is evaluated on the basis of the position data of that pixel, and the deviation is made as a portion motion vector. In addition, in order to make a detection accuracy of the portion motion vector good, an internal interpolation by utilizing the correlative values of the four pixels around the pixel having the minimum correlative value so as to calculate the position data of the pixel having the minimum correlative value.

Then, in the microcomputer 26, it is determined whether or not a value obtained by dividing the average correlative value by the minimum correlative value is larger than a threshold value, and it in determined whether or not the average correlative value is equal to or larger than a predetermined value, and it is determined whether or not a minimum value X (described later) is equal to or larger than a predetermined value P, that is a so-called gradient is detected. Such determinations are performed for each of the detection areas A–D, whereby it is determined whether or not the portion motion vector from each of the detection areas A–D are not erroneously detected due to a moving object and thus reliable, that is, it is determined whether or not each of the detection areas A–D is a valid area. Furthermore, the microcomputer detects an object having repeated pattern in accordance with one method wherein it is determined whether or not the minimum value X is equal to or larger than the predetermined value P for each of the detection areas A–D. If the value obtained by dividing the average correlative value by the minimum correlative value is larger than the predetermined threshold value, and the average correlative value is equal to or larger than the predetermined value, and the minimum value X is equal to or larger than the predetermined value P, the detection area is determined as a valid detection area.

In concrete, whether or not the detection area is the valid detection area is determined as follows:

At first, when the contrast of the screen is low, the luminance difference is small, and therefore, the correlative value becomes small. When a whole of the screen is white, for example, the correlative value is small. In such a case, the reliability of the detection result is small, and therefore, only when the average correlative value is equal to or larger than the predetermined value, the detection area is determined as the valid detection area. In addition, the predetermined value can be determined through field tests or examinations. Thus, on the basis of the average correlative value, it is determined whether or not the screen is low contrast.

Furthermore, when the moving object exists in the detection area, the correlative value at a portion occupied by the moving object and the correlative value when no moving object exists are different from each other. Various kinds of correlative values are obtained by the portion occupied by the moving object, and the correlative value from that portion becomes a large value generally (the correlation degree becomes low). Therefore, when the moving object exists within the detection area, there is a possibility that the minimum correlative value becomes large, and the portion motion vector of that detection area may be erroneously detected. If the portion motion vector is erroneously detected, the whole motion vector is also erroneously detected; however, when the average correlative value is large, the portion motion vector is reliable even if the minimum correlative value is large at some extent. On the other hand, when the average correlative value is small, the portion motion vector is reliable only when the minimum correlative value is smaller. Therefore, in concrete, the detection area is determined as the valid detection area when (the average correlative value/the minimum correlative value)>7, and if this condition is not satisfied, the portion motion vector of the detection area is not utilized so as to avoid the influence due to the above described erroneous detection. Thus, the microcomputer 26 determines the presence or absence of the moving object by evaluating the value of the average correlative value/the minimum correlative value.

Furthermore, in the microcomputer 26, one point having the minimum correlative value and the correlative values of four points around the one point are utilized so as to detect the object having repeated pattern (stripes, for example).

Figures 5, 6:
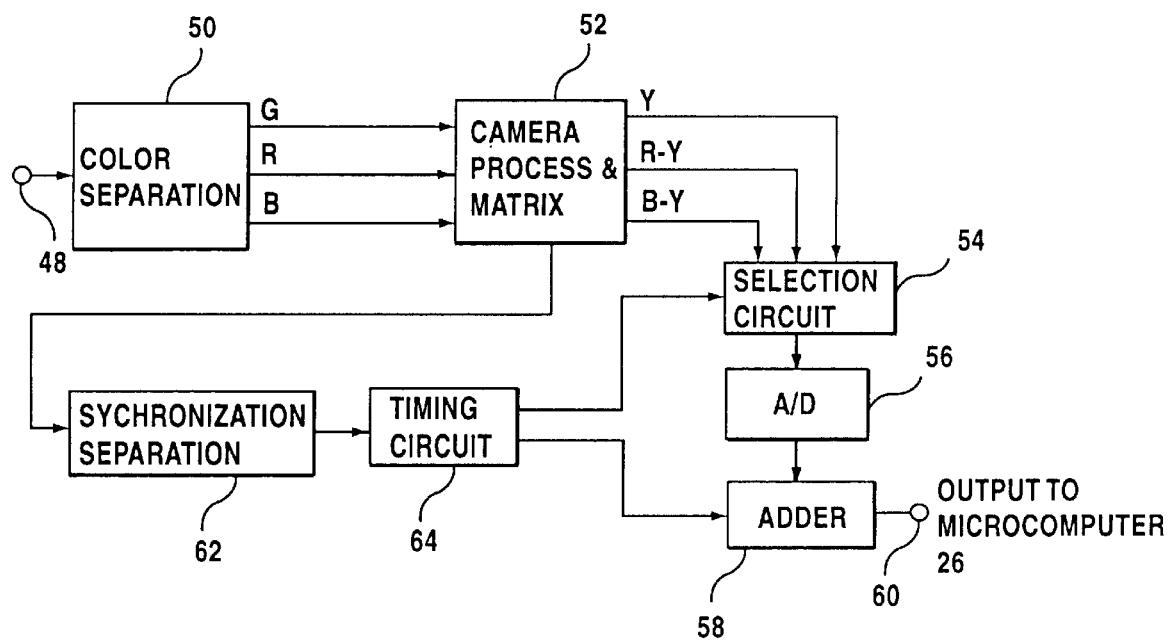
FIG. 5 is an illustrative view showing a method or detecting an object having repeated pattern by utilizing a pixel having a minimum correlative value and four pixels around the same.
FIG. 6 is a block diagram showing an addition data generating circuit of FIG. 1 embodiment.

More specifically, on the assumption that the minimum correlative value is M, and the correlative values of the four points at left, right, up, and down are L, R, U, and D as shown in FIG. 5. The differences between the respective correlative values, i.e. L–M, R–M, U–M and D–M are calculated, and a minimum value of the differences is defined as the minimum value X. The minimum value X is compared with the predetermined value P that is determined through field tests (P=4, in this embodiment). Then, if the minimum value X is equal to or larger than the predetermined value, it is determined that the detection area is the valid detection area, and if the minimum value X is smaller than the predetermined value, the detection area is determined as an invalid detection area.

Thus, by determining whether or not the above described three conditions can be satisfied, it is determined whether the detection area is the valid detection area or the invalid detection area.

Then, a mean value of the portion motion vectors of the valid detection areas is evaluated, and the same is made as a motion amount between the fields, that is, the whole motion vector $V_n$. The whole motion vector $V_n$ is representative of the motion amount between the fields and a direction thereof.

Furthermore, to the microcomputer 26, color signal addition data and luminance signal addition data from an addition data generating circuit 46 are applied, respectively, whereby the object having repeated pattern can be detected.

Figure 7:
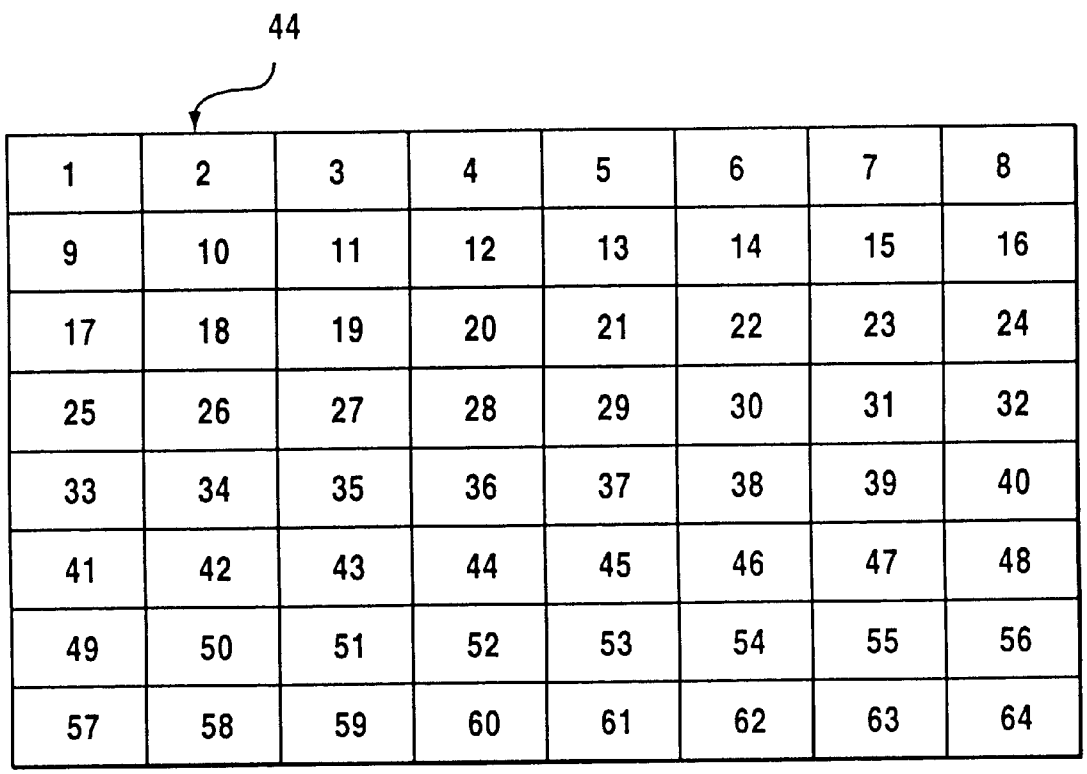
FIG. 7 is an illustrative view showing a state where the image field is divided into 64 addition regions to detect the object having repeated pattern.

With reference to FIG. 6, the addition data generating circuit 46 includes an input end 48 which receives the electric signal from the solid-state image sensing device 12, and three-color signals R, G and B are derived from the electric signal by a (color separation circuit 50. The three-color signals are inputted to a color process and matrix circuit 52, so that a luminance signal Y, color difference signals R-Y and B-Y are generated. The luminance signal Y and the color signal R-Y and B-Y are switched by a selection circuit 54 field by field so as to be inputted to an A/D converter 56. The luminance signal Y and the color difference signals R-Y and D-Y are converted into digital signals by the A/D converter 56, and then, inputted to an adder 58. In the adder 58, the digital luminance signal Y and the digital color difference signals R-Y and B-Y are processed as follows:

First, as shown in FIG. 7, a whole screen, i.e. the image field 44 is divided into 64 (=8×8) addition regions. For convenience, (1), (2), (3), . . . , (64) are assigned to respective addition regions in an order that a left-upper regions becomes (1) and a right-lower regions becomes (64).

The luminance signal Y, and the color difference signals R-Y and B-Y are respectively sampled with 3.58 MHz, for example, the digital data of the luminance signal Y and the color difference signals R-Y and B-Y are accumulated for an (i: $1 \leq i \leq 64$)th addition region, so that the color signal addition data and the luminance signal addition data are obtained. At this time, the luminance signal addition data and the color signal addition data are obtained by accumulating a predetermined number (27, in this embodiment) of digital data of the luminance signal Y, and the color difference signals R-Y and B-Y, respectively. Such processings are performed for each of the addition regions of 64. The luminance signal addition data and the color signal addition data are outputted from an output end 60 to be saved or stored in a memory (not shown) of the microcomputer 26.

The microcomputer 26 determines whether or not the object having repeated pattern is included in the image field 44 by utilizing the luminance signal addition data and the color signal addition data stormed in the memory so as to determine a method for correcting the blurring of the image due to the unintentional motion of the video camera, that is, a method for performing the electronic picture stabilization.

First, differences between the color signal addition data and the luminance signal addition data of the (i)th addition region and the color signal addition data and the luminance signal addition data of an (i−1)th addition region being adjacent to the (i)th addition region are evaluated, respectively, and the differences are compared with threshold values a, b and c that are determinedthrough field tests or examinations. That is, in the microcomputer 26, first, it is determined whether or not conditions defined by the following formula (1) can be satisfied.

$$|(R\text{-}Y)_i - (R\text{-}Y)_{i-1}| < a$$

$$|(B\text{-}Y)_i - (B\text{-}Y)_{i-1}| < b$$

$$|Y_i - Y_{i-1}| < c \quad (1)$$

where, $(R\text{-}Y)_i$ and $(B\text{-}Y)_i$ are color signal addition data of the (i)th addition region, $(R\text{-}Y)_{i-1}$ and $(B\text{-}Y)_{i-1}$ are color signal addition data of the (i−1)th addition region, and $Y_i$ and $Y_{i-1}$ are luminance signal addition data of (i)th addition data and the (i−1)th addition region, respectively.

In this embodiment shown, the threshold values are set as a=16, b=16 and c=4–8, for example.

If the all the above described conditions defined by the formula (1) are satisfied, a count value is incremented be cause the (i)th addition region satisfies the conditions in a horizontal direction. Such determination is performed for each of the addition regions.

Furthermore, processings similar to the above described processings are also performed in a vertical direction. In the vertical direction, the differences are calculated between data of the (i)th addition region and (i−8)th addition region above the (i)th addition region, and if all conditions defined by the following formula (2) are satisfied, since the conditions in the vertical direction becomes to be satisfied, where by a count value is incremented.

$$|(R\text{-}Y)_i - (R\text{-}Y)_{i-8}| < a$$

$$|(B\text{-}Y)_i - (B\text{-}Y)_{i-8}| < b$$

$$|Y_i - Y_{i-8}| < c \quad (2)$$

where, $(R\text{-}Y)_i$ and $(B\text{-}Y)_i$ are color signal addition data of the (i)th addition region, $(R\text{-}Y)_{i-8}$ and $(B\text{-}Y)_{i-8}$ are color signal addition data of the (i−8)th addition region, and $Y_i$ and $Y_{i-8}$ are luminance signal addition data of the (i)th addition region and the (i−8)th addition region, respectively.

In addition, in this embodiment shown, the above described threshold values are respectively set as A=16, b=16 and c=4–8, for example.

Then, a larger value of a total count value of the horizontal direction and a total count value of the vertical direction is divided by a smaller value of the total count value of the horizontal direction and the total count value of the vertical direction, and if a division result is equal to or larger than a predetermined value (2, in this embodiment shown), it is determined that the object having repeated pattern exists in the image field 44. On the other hand, if the division result is smaller than the predetermined value, it is determined that no object having repeated pattern exists in the image field 44. In each of the cases, the electronic picture stabilization, that is, the correction of the blurring of the image due to the unintentional motion of the video camera is performed in accordance with the cases.

In addition, a selection signal for the selection circuit 54, and addresses of the memory of the microcomputer 26 in which data obtained by accumulating by the adder 58 are stored are generated by a synchronization separation circuit 62 and a timing circuit 64 (FIG. 6).

Next, an integration vector $S_n$ is evaluated by the microcomputer 26. The integration vector $S_n$ is representative of a deviation amount of an image extracting area from a center of the image field 44 and a direction thereof. A method for calculating the integration vector $S_n$ is changed in accordance with the status indicated in the following table, and these status #1–status #4 are determined by a state of the video camera 10 such as the panning or tilting. The data of the table 1 are stored in advance in the memory (not shown) of the microcomputer 26.

TABLE 1

| status #1 | $S_n = 0.996 \cdot S_{n-1} + V_n$ |
|---|---|
| status #2 | $S_n = S_{n-1} - (¼) \cdot |V_n|$ |
|  | If $S_n < 0$, $S_n = 0$ |
| status #3 | $S_n = 0.996 \cdot S_{n-1} + V_n$ |
|  | If $S_n <$ one pixel, $S_n = S_{n-1}$ |
| status #4 | $S_n = 0.996 \cdot S_{n-1} + V_n$ |
|  | If $S_n <$ one pixel, $S_n = S_{n-1}$ |

$S_n$: the integration vector of the n-th field
$S_{n-1}$: the integration vector of the (n−1)th field
$V_n$: the whole motion vector between the (n−1)th field and the n-th field.

The status #1 is similar to the prior art in method for evaluating the integration vector $S_n$. The status #2 is a mode for making the integration vector $S_n$ approach zero irrespective of the direction of the whole motion vector $V_n$, that is, for forcedly centering the image. The status #3 and the status #4 are respectively similar to the status #1; however, in the both statues, if the whole motion vector $V_n$ is smaller than one pixel, the integration vector $S_n$ of the present field is made be the same as the integration vector $S_{n-1}$ of the last field. That is, if the movement of the video camera is small in such a case where the same is fixed by the tripod, the centering operation is stopped. Furthermore, the attenuation coefficient "0.992" of the status #4 is smaller than the attenuation coefficient "0.996" of the status #3, and therefore, the centering operation in the status #4 is performed rapidly in comparison with the status #3.

Furthermore, in the above described table 1, as the attenuation coefficients, "0.996" and "0.992" are utilized, but the attenuation coefficient may be an arbitrary decimal number less than 1. Such the attenuation coefficient has a frequency characteristic. Furthermore, by changing the attenuation coefficient, a speed of the centering operation can be changed.

The integration vector $S_n$ thus evaluated is applied to the memory control circuit 22. In the memory control circuit 22, a start address for reading-out the field memory 24 is determined on the basis of the integration vector $S_n$, and therefore, the digital video signal stored in the field memory 24 becomes to be read-out at the start address. That is, the memory control circuit 22 moves an image extracting area 66 (FIG. 8) formed by the digital video signal from the field memory 24 in accordance with the integration vector $S_n$ calculated by the microcomputer 26.

In addition, since the image extracting area 66 can not be moved by the digital video signal read-out from the field memory 24 as it is, an electronic zooming circuit 70 (FIG. 1) is utilized.

Figure 8:
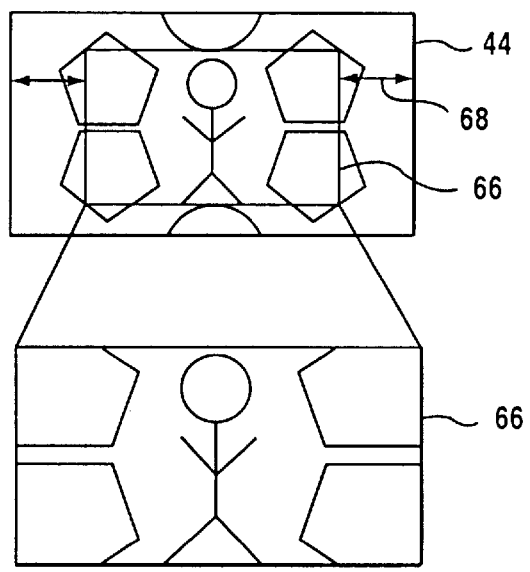
FIG. 8 is an illustrative view showing a principle of an electronic picture stabilization.

With referring FIG. 8, the electronic zooming circuit 70 (FIG. 1) defines the image extracting area 66 wherein an image is enlarged according to a zooming magnification with respect to the image field 44. A position of the image extracting area 66 can be freely moved within a range of the image field 44 by changing the start address for reading-out the digital video signal from the field memory 24. Then, in order to obtain a video signal for a whole area of the image field 24 on the basis of the digital video signal extracted from the image extracting area 66, an image is enlarged by utilizing an internal interpolation on the basis of the digital video signal read-out the field memory 24.

Thus, by zooming-up an image of an arbitrary image extracting area 66 within the image field 44 in an electronic manner by the electronic zooming circuit 70 (FIG. 1), a correctable range 68 that is equal to a difference between the image field 44 and the image extracting area 66 can be formed.

Figure 9:
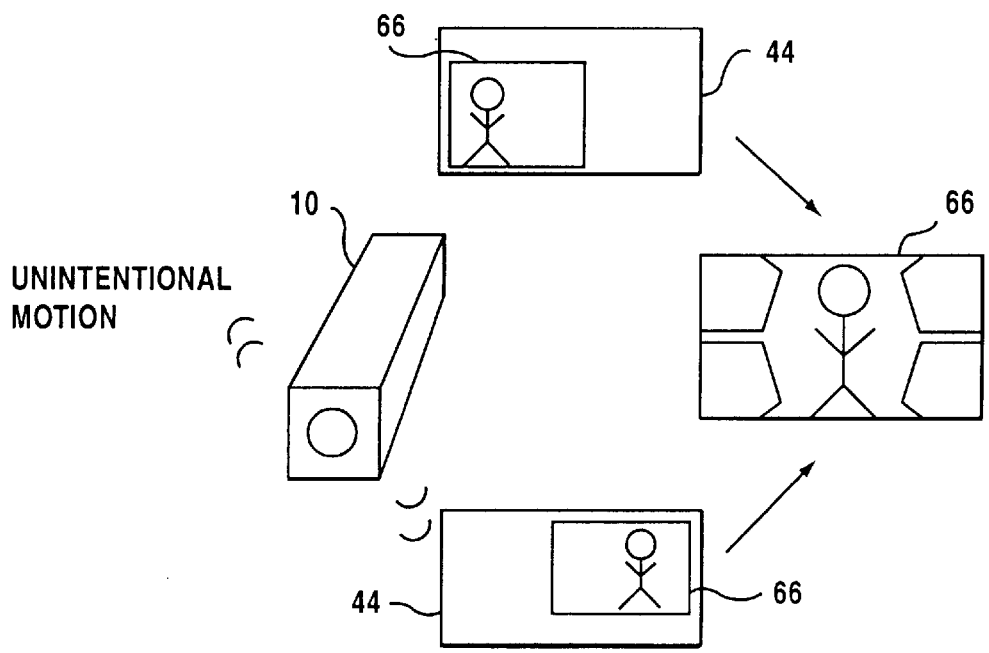
FIG. 9 is an illustrative view showing the detection areas within the image field, to which a representative point matching method is applied.

If an unintentional motion occurs in the video camera 10 as shown in FIG. 9 according to a vibration of a hand of a person who operates the video camera 10, an image from the video camera 10 is blurred, and resulting in a case where an object person exists in a left-lower portion within the image field 44 (shown at an upper portion in FIG. 9) or a case where an object person exists at a right-upper portion within the image field (shown at a lower portion in FIG. 9). Therefore, by moving the image extracting area 46 at every field according to the whole motion vector that is calculated by the microcomputer 26, as shown at a right portion in FIG. 9, the object person can be just positioned in the image extracting area 66.

The digital video signal thus outputted from the electronic zooming circuit 70 is converted into an analog signal by a D/A converter 72 so as to be outputted from an output terminal 74.

In addition, the processings set forth in the following may be executed by the microcomputer 26 at every fields.

Figure 10:
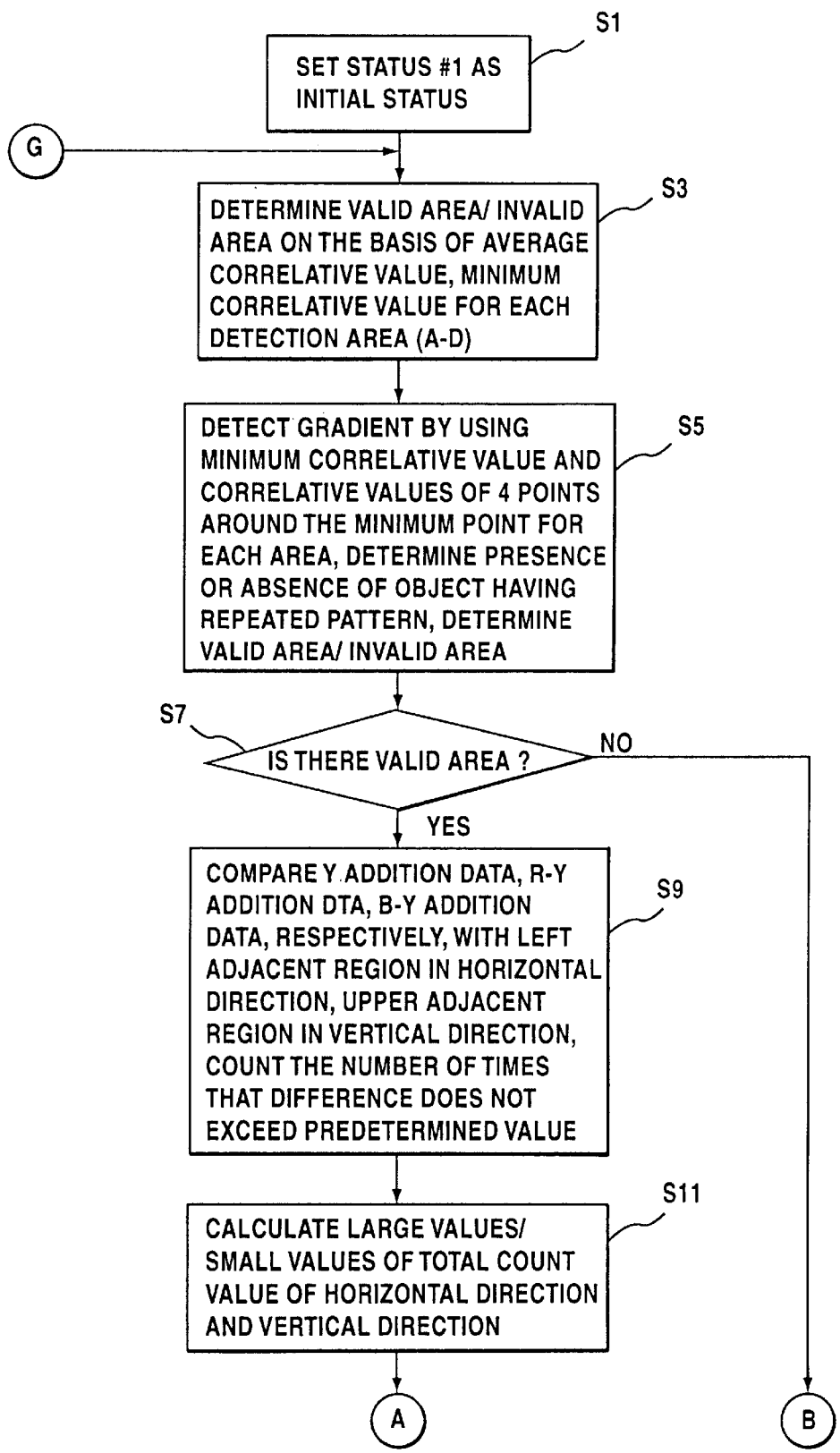
FIG. 10 is a flowchart showing an operation of the embodiment.

First, in a step S1 shown in FIG. 10, as an initial, state, the status #1 is set. For setting the status, a status flag, for example, may be utilized.

In a step 3, it is determined whether each of the detection areas A–D is a valid detection area or an invalid detection area by the microcomputer 26 on the basis of the average correlative value and the minimum correlative value. That is, the microcomputer 26 determines whether or not each of the portion motion vectors detected by the respective detection areas A–D is due to the unintentional motion of the video camera, that is, whether or not the portion motion vector that is effective for determining the unintentional motion of the video camera is detected. As described in the above, the contrast of the screen is determined on the basis of the average correlative value, and the presence or absence of the moving object is determined on the basis of the average correlative value/the minimum correlative value, and thus, it is determined whether each of the detection areas A–D is valid or invalid.

Then, in a step S5, as described in the above, the so-called gradient is detected by the microcomputer 26 for each of the detection areas A–D by utilizing the minimum correlative value and correlative values of four points surrounding the point having the minimum correlative value. Then, on the basis of the gradient (that is, whether or not the minimum value X is equal to or larger than the predetermined value P), the presence or absence of the object having repeated pattern is determined, and thus, it is determined whether each of the detection areas A–D is valid or invalid.

If there is a valid detection area, in a step S9, as described in the above, the microcomputer 26 compares the luminance signal addition data of the luminance signal Y and the color signal addition data of the color difference signals R-Y and B-Y of each of the addition regions with that of the left adjacent addition region in the horizontal direction and the upper adjacent addition region in the vertical direction, respectively, and counts the number of times that the differences between the both data do not exceed the predetermined values. Such processings are executed for each of the respective addition regions shown in FIG. 7. However, as to the addition regions of (1), (9), (17), (25), (33), (41), (49) and (57) at the left end of the image field, since no left adjacent addition regions exist, the comparison in the horizontal direction is not executed. Therefore, the comparison in the horizontal direction is executed for each of the addition regions of 56 in total. Similarly, as to the addition regions (1)–(8) at the uppermost line, no upper adjacent addition regions exist, and therefore, the comparison in the vertical direction is not executed. Therefore, the comparison in the vertical direction is also executed for each of the addition regions of 56 in total.

Then, in a step S11, the microcomputer 26 divides a larger value out of the total count value of the horizontal direction and the total count value of the vertical direction by a smaller value thereof, and if the division result is equal to or larger than the predetermined value in a step S13, the process proceeds to a step S15 in which the whole motion vector of the last field is made as the whole motion vector $V_n$ of the present field. In addition, if it is determined that there is no valid detection area in the step S7, the process proceeds to the step S15.

On the other hand, if it is determined that the division result is smaller than the predetermined value in the step S13, the process proceeds to a step S17 in which a mean value of the portion motion vectors of the valid detection areas is evaluated, and the same is made as the whole motion vector $V_n$ at the present field. After the step S15 or the step S17, the process proceeds to a step S19 in which it is determined whether or not the present status is the status #1. If the status #1, in a step S21, the integration vector $S_n$ is calculated on the basis of the equation of $S_n = 0.996 \times S_{n-1} + V_n$.

Figure 12:
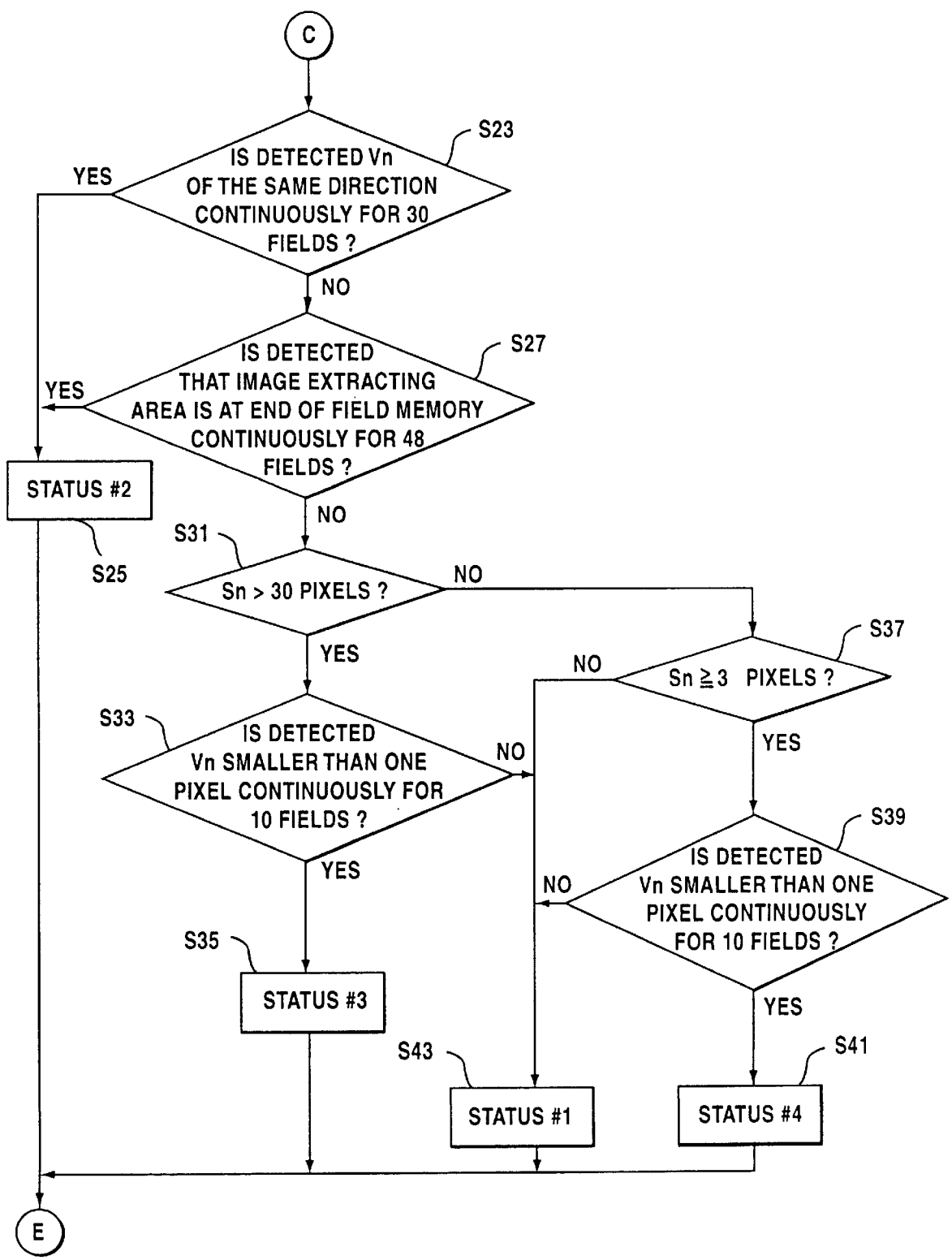
FIG. 12 is a flowchart showing an operation succeeding to FIG. 11.

Next, in a step S23 shown in FIG. 12, it is determined whether or not the fields in each of which the whole motion vector $V_n$ of the same direction are continuously detected for 30 fields. If "YES" is determined in the step S23, in a step S25, the status is changed to the status #2 from the status #1, that is, a flag for the status #2 is set. If "NO" is determined in the step S23, in a step S27, it is determined whether or not the integration vector $S_n$ becomes larger than the correctable range 68 (FIG. 8) and it is determined whether or not the fields in each of which the image extracting position of the image extracting area 66 exists at the end of the image field 44 are continuously detected for 48 fields. If "YES" is determined in the step S27, the status is changed to the status #2 in the step S25.

Figure 14:
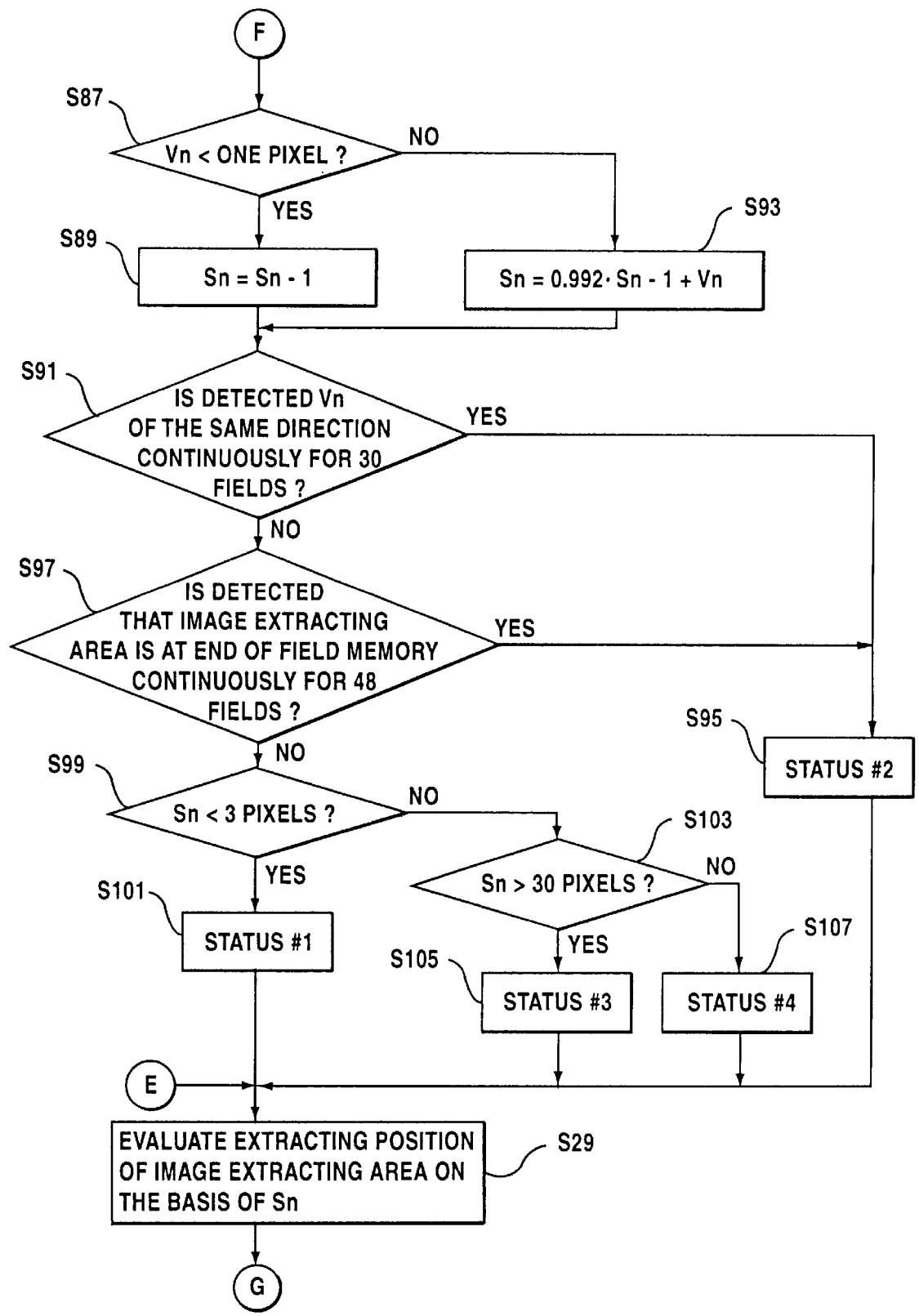
FIG. 14 is a flowchart showing an operation succeeding to FIG. 13.

Then, the process proceeds to a step S29 shown in FIG. 14, and the image extracting position of the image extracting area 66 is calculated on the basis of the integration vector $S_n$, whereby the image extracting area 66 is moved so that the blurring of the image due to the unintentional motion of the video camera is corrected.

If "NO" is determined in the step S27 shown in FIG. 12, the process proceeds to a step S31 in which it is determined whether or not the integration vector $S_n$ is larger than 30 pixels. If "YES" is determined in the step S31, in a next step S33, it is determined whether or not the fields in each of which the whole motion vector $V_n$ is smaller than one pixel are continuously detected for 10 fields. If "YES" is determined in the step S33, the status is changed to the status #3 from the status #1, and then, the process proceeds to the step S29.

If "NO" is determined in the step S31, in a step S37, it is determined whether or not the integration vector $S_n$ is equal to or larger than 3 pixels. If "YES" is determined in the step S37, in a step S39, as similar to the step S33, it is determined whether or not the fields in each of which the portion motion vector $V_n$ is smaller than one pixel are continuously detected for 10 fields. If "YES" is determined in the step S37, in a step S41, the status is changed to the status #3 from the status #1, and then, the process proceeds to the step S29. If "NO" is determined in any of the steps S33, S37 and S39, the status remains at the status #1 in a step S43, and then, the process proceeds to the step S29.

Figure 11:
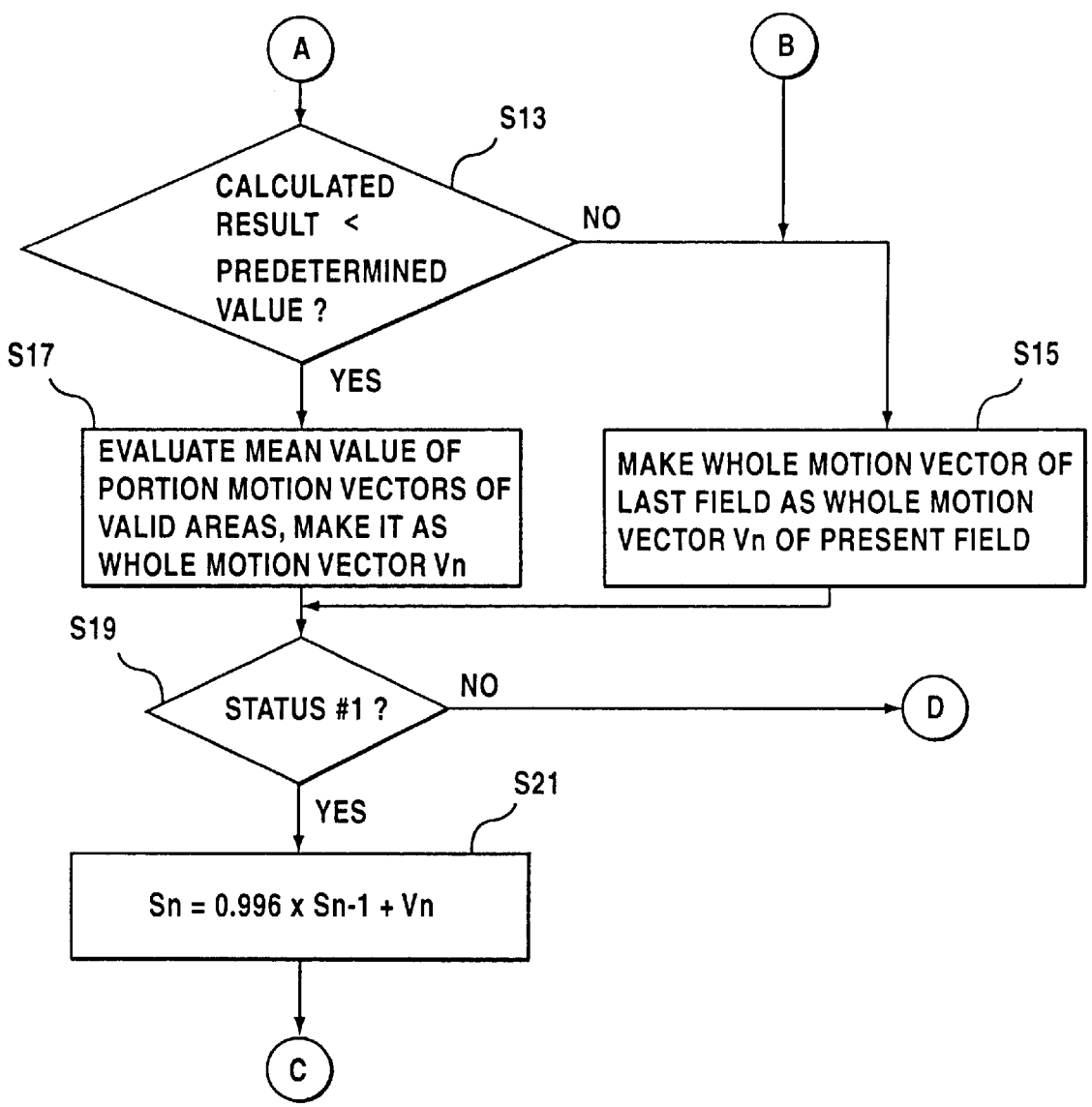
FIG. 11 is a flowchart showing an operation succeeding to FIG. 10.
Figure 13:
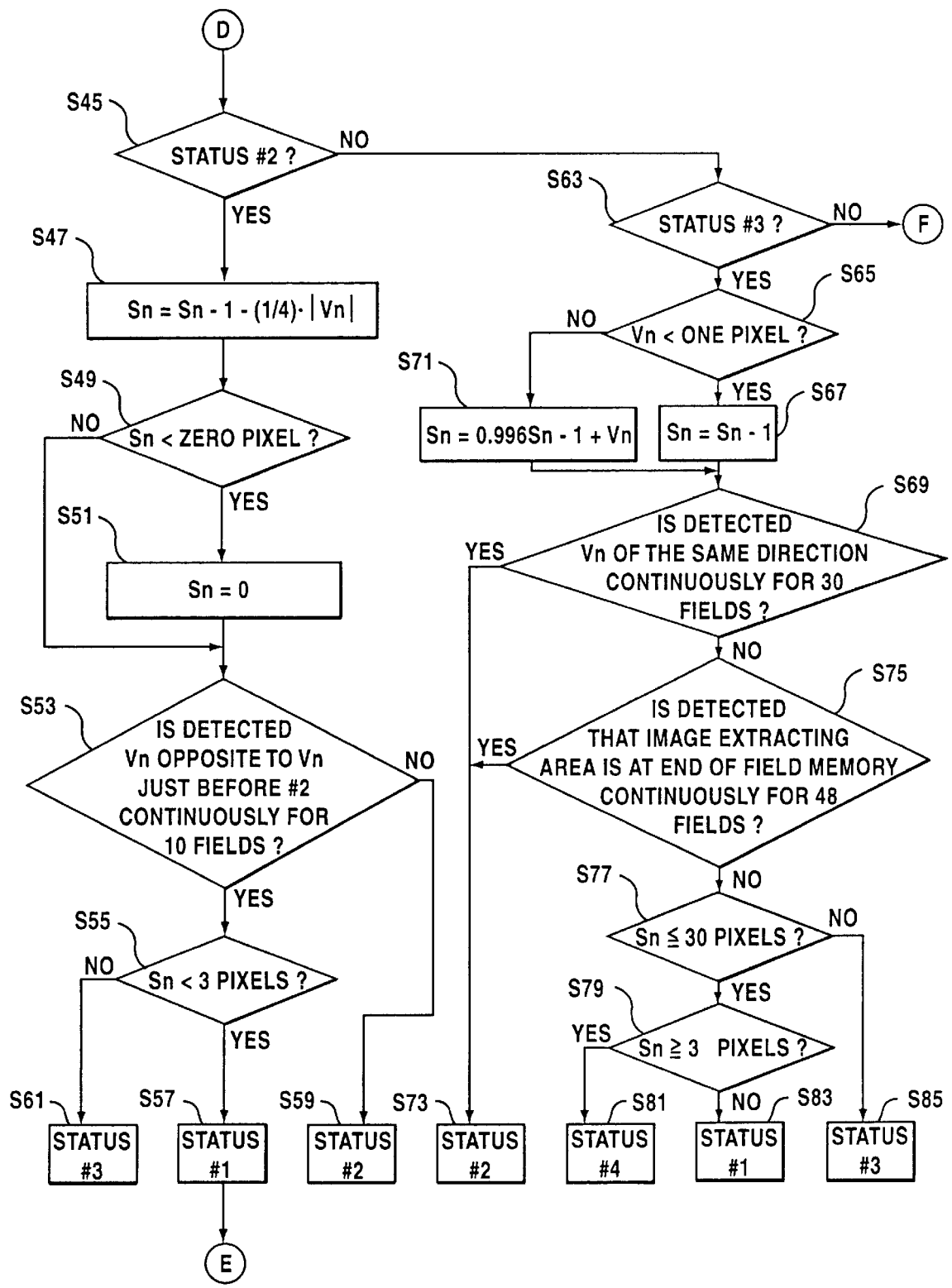
FIG. 13 is a flowchart showing an operation succeeding to FIG. 12.

If the status is not the status #1 in the step S19 shown in FIG. 11, the process proceeds to a step S45 shown in FIG. 13. If the status is the status #2 in the step S45, in a step S47, the integration vector $S_n$ is calculated according to the equation of $S_n = S_{n-1} - (\frac{1}{4}) \cdot |V_n|$. Next, in a step S49, it is determined whether or not the integration vector $S_n$ is smaller than zero pixel, that is, whether or not the integration vector $S_n$ becomes negative and if "YES" is determined in the step S49, in a step S51, the integration vector $S_n$ is set as zero ($S_n=0$), and then, the process proceeds to a step S63. If "NO" is determined in the step S49, the process directly proceeds to the step S53. In the step S53, it is determined whether or not the fields in each of which the whole motion vector $V_n$ becomes opposite to the whole motion vector $V_n$ just before the status enters in the status #2 are continuously detected for 10 fields. If "YES" is determined in the step S53, in a step S55, it is determined whether or not the integration vector $S_n$ is smaller than 3 pixels. If "YES" is determined in the step S55, in a step S57, the status is set in the status #1 from the status #2. If "NO" is determined in the step S53, the status remains in the status #2. Furthermore, if "NO" is determined in the step S55, in a step S61, the status is changed to the status #3 from the status #2. After the step S57, S59 or S61, the process proceeds to the step S29 (FIG. 14).

On the other hand, if the status is not the status #2 in the step S45, in a step S63, it is determined whether or not the status is the status #3. If "YES" is determined in the step S63, in a step S65, it is determined whether or not the whole motion vector $V_n$ is smaller than one pixel. If the whole motion vector $V_n$ is smaller than one pixel, in a step S67, the integration vector $S_n$ is set as $S_n = S_{n-1}$, and then the process proceeds to a step S69. If "NO" is determined in the step S65, in a step S71, the integration vector $S_n$ is calculated according to the equation $S_n = 0.996 \cdot S_{n-1} + V_n$, and then the process proceeds to the step S69. In the step S69, as similar to the above described step S23 (FIG. 12), it is determined whether or not the fields in each of which the whole motion vector $V_n$ is the same direction are continuously detected for 30 fields. Then, if "YES" is determined in the step S69, in a step S73, the status is changed to the status #2 from the status #3.

If "NO" is detected in the step S39, in a step S75, as similar to the above described step S27 (FIG. 12), it is determined whether or not the image fields in each of which the image extracting position of the image extracting area is at the end of the field memory 44 are continuously detected for 48 fields. If "YES" is detected in the step S75, in the previous step S73, the status is changed to the status #2.

If "NO" is detected in the step S75, in a step S77, it is determined whether or not the integration vector $S_n$ is equal to or smaller than 30 pixels. If "YES" is determined in the step S77, in a step S79, as similar to the above described step S37, it is determined whether or not the integration vector $S_n$ is equal to or larger than 3 pixels. If "YES" is determined in the step S79, that is, if the integration vector $S_n$ exists within a range of 3 pixels to 30 pixels, in a step S81, the status is changed to the status #4 from the status #3. Furthermore, if "NO" is detected in the step S79, that is, if the integration vector $S_n$ is smaller than 3 pixels, in a step S83, the status is changed to the status #1 from the status #3. In addition, if "NO" is determined in the step S77, that is, the integration vector $S_n$ is larger than 30 pixels, in a step S85, the status remains in the status #3. After the step S73, S81, S83, or S85, the process proceeds to the step S29 (FIG. 14).

Furthermore, if it is determined that the status is not the status #3 in the step S63, the process proceeds to a step S87 shown in FIG. 14 because the status is determined as the status #4. In a step S87, as similar to the above described step S65, it is determined whether or not the whole motion vector $V_n$ is smaller than one pixel. Therefore, if the whole motion vector $V_n$ is smaller than one pixel, in a step S89, the integration vector $S_n$ is set according to the equation of $S_n = S_{n-1}$, and then the process proceeds to a step S91. If "NO" is determined in the step S87, in a step S93, the integration vector $S_n$ is evaluated according to the equation of $S_n = 0.996 \cdot S_{n-1} + V_n$, and then, the process proceeds to the step S91 in which, as similar to the above described steps S23 and S69, it is determined whether or not the fields in each of which the whole motion vector $V_n$ is the same direction are continuously detected for 30 fields. Therefore, if "YES" is determined in the step S91, in a step S95, the status is changed to the status #2 from the status #4, and thereafter, the process proceeds to the step S29.

On the other hand, if "NO" is determined in the step S91, in a step S97, as similar to the above described steps S27 and S75, it is determined whether or not the field in each of which the image extracting position of the image extracting area 66 exists at the end of the image field 44 are continuously detected for 48 fields. If "YES" is detected in the step S97, in the step S95, the status is changed to the status #2 from the status #4, and then the process proceeds to the step S29. If "NO" is determined in the step S97, in a step S99, as similar to the above described step S55, it is determined whether or not the integration vector $S_n$ is smaller than 3 pixels. Then, if "YES" is determined in the step S99, in a step S101, the status is changed to the status #1 from the status #4, and then, the process proceeds to the step S29.

If "NO" is determined in the step S99, in a step S103, as similar to the step S31, it is determined whether or not the integration vector $S_n$ is larger than 30 pixels. If "YES" is determined in the step S103, in a step S105, the status is changed to the status #3 from the status #4; however, if "NO" is detected in the step S103, in a step S107, the status remains in the status #4. After the step S105 or S107, the process proceeds to the step S29.

In the video camera 10, which operates in the above described manner, if the state of the video camera 10 is merely the unintentional motion, the status is set as the status

1. If the panning or tilting of the video camera is performed, the status is set as the status #2. Furthermore, if there is little unintentional motion in such a case where the video camera is fixed by the tripod, for example, the status is set as the status #3 or the status #4.

Therefore, during the panning or tilting, the image is forcedly centered, but after the panning or tilting, no centering operation is performed. Furthermore, if the centering operation is not completed during the panning or tilting, when the whole motion vector $V_n$ is small, the status #3 or the status #4 is set, whereby the centering operation is stopped because the integration vector is set as $S_n = S_{n-1}$.

Figure 15:
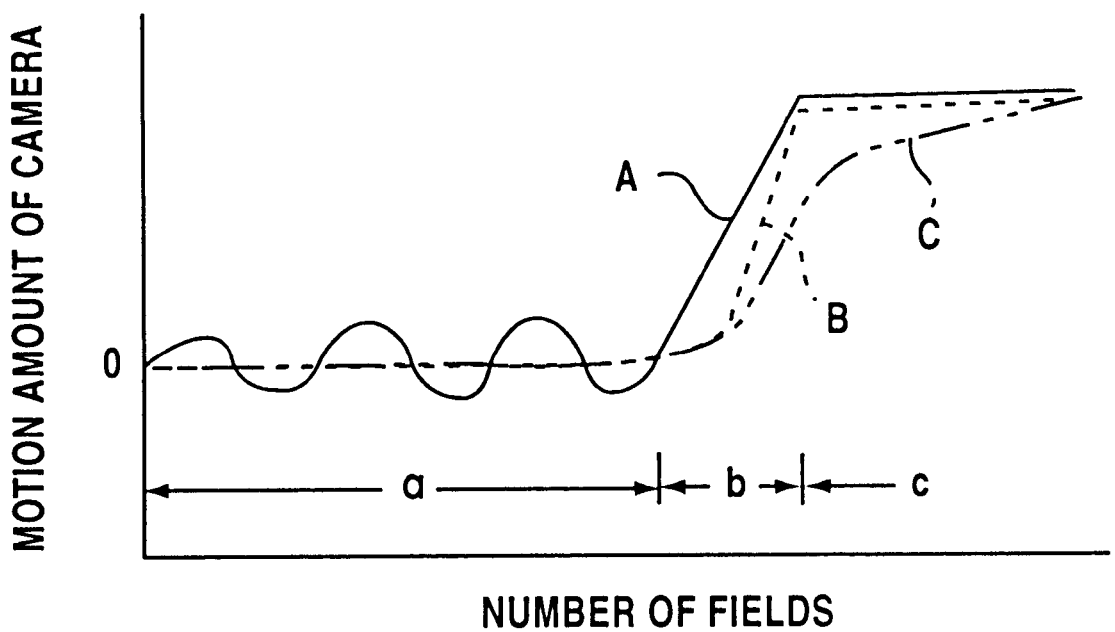
FIG. 15 is a graph showing states of the electronic picture stabilization in comparison with the prior art.

If the video camera 10 is panned from a state that the unintentional motion of the video camera occurs and thereafter, the video camera 10 is fixed, the relationship between the number of fields and the moving amount of the video camera 10 becomes to have a relationship as shown in FIG. 15. In FIG. 15, a solid line A indicates the moving amount of the video camera 10 itself, and a dotted line B indicates the moving amount of the image extracting area 66 after the electronic picture stabilization is performed in the video camera 10, and a two-dotted line C indicates the moving amount of the image extracting area 66 after the electronic picture stabilization is performed by the prior art method.

At first, when the unintentional motion of the video camera 10 occurs as shown in the period (a) in FIG. 15, the blurring of the image due to the unintentional motion of the video camera is corrected by the status #1. When the state of the video camera enters in the panning from the unintentional motion of the video camera, as shown by the period (b), in the initial state, the unintentional motion of the video camera is corrected, but, thereafter the image extracting position of the image extracting area 66 becomes to exist at the end of the image field 44 because the integration vector $S_n$ exceeds the correctable range 68 (FIG. 8). If such a state is continuously detected for 48 fields, the status is changed to the status #2. Then, the blurring of the image is corrected by the equation of $S_n = S_{n-1} - (1/4) \cdot |V_n|$, and the movement of the image after the correction rapidly approaches the movement of the video camera 10 itself, that is, the dotted line B rapidly approaches the solid line A. That is, the forcedly centering by which the image extracting position of the image extracting area 66 moves toward a center of the image field 44 is rapidly performed. Then, as shown in the period (c), if the video camera 10 is in a fixed state after the completion of the panning of the video camera, because the integration vector $S_n$ due to the centering becomes small, the status becomes again in the status #1. When the video camera 10 is fixed, the whole motion vector $V_n$ is small, and therefore, the status is changed to the status #4 so that the centering operation is stopped after 10 fields.

Therefore, in the prior art method, after the completion of the panning of the video camera, the centering operation occurs (shown by the two-dotted line C); however, in the video camera of this embodiment shown, the centering operation becomes to be approximately completed during the panning operation of the video camera, or even if the centering operation is not completed, it is determined that the unintentional motion of the video camera is small because the same is fixed by the tripod, and therefore, according to the embodiment shown, no centering operation after the panning of the video camera does not occur.

According to the above described embodiment, the presence or absence of the object having repeated pattern by which the correlative values are not detected correctly is accurately detected by utilizing the color signal level and the luminance signal level, an malfunction at a time that the object has repeated pattern can be prevented, and therefore, the blurring of the image due to the unintentional motion of the video camera 10 can be accurately corrected. Therefore, in this embodiment shown, it is possible to eliminate the following disadvantages.

More specifically, in the prior method, in order to accurately perform the electronic picture stabilization, it is necessary to accurately grasp the state of the image, and therefore, an object having the repeated pattern is detected in a manner as follows: More specifically, by detecting absolute values of the differences of the respective correlative values between the pixel having the minimum correlative value and the correlative values of four pixels surrounding the point of the minimum correlative value, the presence or absence of the repeated pattern is detected, and then, a method for calculating the whole motion vector $V_n$ is determined.

However, in the prior art method, there is a case where the repeated pattern can not be detected. Therefore, there occurs a case where the whole motion vector $V_n$ can not be calculated in accordance with a method according to the object having repeated pattern, and therefore, there is a possibility that the blurring of the image due to the unintentional motion of the video camera can not be accurately corrected because the vibration of the image is not stopped due to the malfunction. In contrast, in this embodiment shown, since the presence or absence of the object having repeated pattern can be accurately detected, and therefore, it is possible to accurately correct the unintentional motion of the video camera.

In addition, a method for utilizing the total count value of the horizontal direction and the total count value of the vertical direction is not limited to one of the above described, and therefore, the correction for the unintentional motion of the video camera may be stopped in a case where the differences between one total count value and the other total count value is more than the predetermined value, or one of or both of the two total count values are becomes over the predetermined value, the correction due to the unintentional motion of the video camera may be stopped.

Furthermore, the comparison of the addition data may be performed between the right adjacent addition region in the horizontal direction, and with the lower adjacent addition region in the vertical direction.

Furthermore, the motion vector may be evaluated by utilizing an angle speed sensor other than a method in which the representative marching method is utilized.

Furthermore, in the above described embodiments, the microcomputer 26 executes the operation according to the flowcharts shown in FIGS. 10–14 at every fields; however, the same may be executed at every frames. In such a case, the whole motion-vector becomes a whole motion vector between the last frame and the present frame.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A video camera, comprising:

first integration vector calculating means for calculating an integration vector $S_n$ according to the following equation (1) on the basis of a whole motion vector $V_n$, where $$S_n = K_1 \cdot S_{n-1} + V_n \qquad (1)$$

$S_n$: an integration vector of n-th field or frame $S_{n-1}$: an integration vector of (n−1)th field or frame $V_n$: a whole motion vector between the (n−1)th field or frame and the n-th field or frame $K_1$: an attenuation coefficient less than 1;

second integration vector calculating means for calculating an integration vector $S_n$ of the image according to the following equation (2) on the basis of the whole motion vector $V_n$, where $$S_n = S_{n-1} - K_2 \cdot |V_n| \qquad (2)$$

$K_2$: an attenuation coefficient less than 1: and correction means for correcting a blurring of an image according to the integration vector calculated by one of said first integration vector calculating means and said second integration vector calculating means.

2. A video camera according to claim 1, further comprising first detection means for detecting at least one of a panning and a tilting, wherein said correction means begins to perform correction by utilizing the integration vector calculated by said second integration vector calculating means, in response to detection of said first detection means at a time in which correction utilizing the integration vector calculated by said first integration vector calculating means is performed.

3. A video camera according to claim 2, further comprising:

second detection means for detecting completion of at least one of the panning and the tilting; and third detection means for detecting that the integration vector is smaller than a first predetermined value, wherein said correction means begins to perform the correction by utilizing the integration vector calculated by said first integration vector calculating means, in response to detection of said second detection means and detection of said third detection means at a time in which the correction utilizing the integration vector calculated by said second integration vector calculating means is performed.

4. A video camera according to claim 3, further comprising third integration vector calculating means for calculating an integration vector $S_n$ according to the following equation (3) on the basis of the whole motion vector $V_n$, $$S_n = K_3 \cdot S_{n-1} + V_n \qquad (3)$$

$K_3$: an attenuation coefficient less than 1 said third integration vector calculating means calculating said integration vector according to an equation $S_n = S_{n-1}$ when the whole motion vector is smaller than one pixel.

5. A video camera according to claim 4, further comprising:

fourth detection means for detecting that the whole motion vector is smaller than a second predetermined value; and fifth detection means for detecting that the integration vector is larger than a third predetermined value, wherein said correction means begins to perform correction by utilizing the integration vector calculated by said third integration vector calculating means, in response to detection of said fourth detection means and detection of said fifth detection means at a time in which the correction utilizing the integration vector calculated by said first integration vector calculating means is performed.

6. A video camera according to claim 5, wherein said correction means begins to perform the correction by utilizing the integration vector calculated by said first integration vector calculating means, in response to the detection of said third detection means at a time in which the correction utilizing the integration vector calculated by said third integration vector calculating means is performed.

7. A video camera according to claim 6, wherein said correction means begins to perform the correction by utilizing the integration vector calculated by said second integration vector calculating means, in response to the detection of said first detection means at a time in which the correction utilizing the integration vector calculated by said third integration vector calculating means is performed.

8. A video camera according to claim 7, wherein said correction means begins to perform the correction by utilizing the integration vector calculated by said third integration vector calculating means, in response to the detection of said second detection means and the detection of said third detection means at a time in which the correction utilizing the integration vector calculated by said second integration vector calculating means is performed.

9. A video camera according to claim 3, further comprising fourth integration vector calculating means for calculating an integration vector $S_n$ of the image according to the following equation (4), $$S_n = K_4 \cdot S_{n-1} + V_n \qquad (4)$$

$K_4$: an attenuation coefficient less than 1 said fourth integration vector calculating means calculating said integration vector according to an equation $S_n = S_{n-1}$ when the whole motion vector is smaller than one pixel.

10. A video camera according to claim 9, further comprising:

fourth detection means for detecting that the whole motion vector is smaller than a second predetermined value; and sixth detection means for detecting that the integration vector exists within a predetermined range, wherein said correction means begins to perform correction by utilizing the integration vector calculated by said fourth integration vector calculating means, in response to detection of said fourth detection means and detection of said sixth detection means at a time in which the correction utilizing the integration vector calculated by said first integration vector calculating means is performed.

11. A video camera according to claim 10, wherein said correction means begins to perform the correction by utilizing the integration vector calculated by said first integration vector calculating means, in response to the detection of said third detection means at a time in which the correction utilizing the integration vector calculated by said fourth integration vector calculating means is performed.

12. A video camera according to claim 11, wherein said correction means begins to perform the correction by utilizing the integration vector calculated by said second integration vector calculating means, in response to the detection of said first detection means at a time in which the correction utilizing the integration vector calculated by said fourth integration vector calculating means is performed.

13. A video camera according to claim 8, further comprising fourth integration vector calculating means for calculating an integration vector $S_n$ of the image according to the following equation (4), $$S_n = K_4 S_{n-1} + V_n \qquad (4)$$

$K_4$: an attenuation coefficient less than 1 said fourth integration vector calculating means calculating said integration vector according to an equation $S_n = S_{n-1}$ when the whole motion vector is smaller than one pixel.

14. A video camera according to claim 13, wherein said correction means begins to perform the correction by utilizing the integration vector calculated by said third integration vector calculating means, in response to the detection of said fifth detection means at a time in which the correction utilizing the integration vector calculated by said fourth integration vector calculating means is performed.

15. A video camera according to claim 13, further comprising sixth detection means for detecting that the integration vector exists within a predetermined range, wherein said correction means begins to perform the correction by utilizing the integration vector calculated by said fourth integration vector calculating means, in response to detection of said sixth detection means at a time in which the correction utilizing the integration vector calculated by said third integration vector calculating means is performed.

16. A video camera according to claim 2, 7 or 12, wherein said first detection means detects at least one of the panning and the tilting at a time that a fourth predetermined number of fields or frames in each of which the integration vector Sn is equal to or greater than a predetermined threshold value are continuously detected, or at a time that a fifth predetermined number of fields or frames in each of which the whole motion vector $V_n$ has the same direction are continuously detected.

17. A video camera according to claim 3 or 8, wherein said second detection means detects the completion of at least one of the panning and the tilting at a time that a predetermined number of fields or frames in each of which the whole motion vector becomes opposite to the whole motion vector just before said correction means performs the correction by utilizing the integration vector calculated by said second integration vector calculating means are continuously detected.

18. A video camera according to claim 1, further comprising:

addition means for obtaining image signal addition data by performing an integration operation to obtain an image signal level including a chrominance signal level for each of a plurality of regions which are formed by dividing an image field;

first arithmetic operation means for evaluating differences of said image signal addition data between each of said regions and an adjacent region in a horizontal direction;

second arithmetic operation means for evaluating differences of said image signal addition data between each of said regions and an adjacent region in a vertical direction;

first count means for counting the number of the regions in each of which the difference evaluated by said first arithmetic operation means is equal to or less than a first threshold value;

second count means for counting the number of the regions in each of which the difference evaluated by said second arithmetic operation means is equal to or less than a second threshold value; and determining means for calculating the whole motion vector on the basis of a count value of said first count means and a count value of said second count means.

19. A video camera according to claim 18, wherein said determining means includes division means for dividing a larger value of the count value of said first count means and the count value of said second count value by a smaller value of the count value of said first count means and the count value of said second count means, and comparing means for comparing a division result with a third threshold value.

20. A video camera according to claim 19, further comprising first means for making a mean value of portion motion vectors of detection areas being determined to be valid areas on the basis of the count value of said first count means and the count value of said second count means as the whole motion vector between the fields or frames when the division result is smaller than the third threshold value, and a second means for making the whole motion vector one field or frame before as the whole motion vector of a present field or frame when the division result is equal to or larger than the third threshold value.

21. A video camera, comprising:

addition means for obtaining image signal addition data by performing an integration operation to obtain an image signal level including a chrominance signal level for each of a plurality of regions which are formed by dividing an image field;

first arithmetic operation means for evaluating differences of said image signal addition data between each of said regions and an adjacent region in a horizontal direction;

second arithmetic operation means for evaluating differences of said image signal addition data between each of said regions and an adjacent region in a vertical direction;

first count means for counting the number of the regions in each of which the difference evaluated by said first arithmetic operation means is equal to or less than a first threshold value;

second count means for counting the number of the regions in each of which the difference evaluated by said second arithmetic operation means is equal to or less than a second threshold value; and determining means for calculating the whole motion vector on the basis of a count value of said first count means and a count value of said second count means.

* * * * *